United States Patent
Mouazen et al.

(10) Patent No.: US 10,119,053 B2
(45) Date of Patent: Nov. 6, 2018

(54) USE OF A BITUMINOUS COMPOSITION AS AN ADHESIVE BINDER

(71) Applicant: TOTAL MARKETING SERVICES, Puteaux (FR)

(72) Inventors: Mouhamad Mouazen, Lyons (FR); Jean-Pierre Mesnil, Puteaux (FR); Régis Vincent, Grigny (FR); Laurence Lapalu, Villeurbanne (FR)

(73) Assignee: TOTAL MARKETING SERVICES, Puteaux (FR)

( * ) Notice: Subject to any disclaimer, the term of this patent is extended or adjusted under 35 U.S.C. 154(b) by 93 days.

(21) Appl. No.: 15/304,952

(22) PCT Filed: Apr. 17, 2015

(86) PCT No.: PCT/EP2015/058378
§ 371 (c)(1),
(2) Date: Oct. 18, 2016

(87) PCT Pub. No.: WO2015/158889
PCT Pub. Date: Oct. 22, 2015

(65) Prior Publication Data
US 2017/0174962 A1    Jun. 22, 2017

(30) Foreign Application Priority Data

Apr. 18, 2014 (FR) .................... 14 53546

(51) Int. Cl.
| | | |
|---|---|---|
| *C09J 195/00* | (2006.01) | |
| *B32B 37/18* | (2006.01) | |
| *C09J 11/06* | (2006.01) | |
| *C09J 5/00* | (2006.01) | |
| *B32B 37/12* | (2006.01) | |
| *C09J 11/08* | (2006.01) | |
| *B32B 5/18* | (2006.01) | |
| *B32B 7/12* | (2006.01) | |
| *B32B 13/04* | (2006.01) | |
| *E04D 11/02* | (2006.01) | |
| *C08K 5/09* | (2006.01) | |
| *C08L 95/00* | (2006.01) | |
| *C08L 23/08* | (2006.01) | |

(52) U.S. Cl.
CPC .............. *C09J 195/00* (2013.01); *B32B 5/18* (2013.01); *B32B 7/12* (2013.01); *B32B 13/045* (2013.01); *B32B 37/1207* (2013.01); *B32B 37/1284* (2013.01); *B32B 37/18* (2013.01); *C09J 5/00* (2013.01); *C09J 11/06* (2013.01); *C09J 11/08* (2013.01); *B32B 2037/1215* (2013.01); *B32B 2250/02* (2013.01); *B32B 2255/26* (2013.01); *B32B 2266/057* (2016.11); *B32B 2305/022* (2013.01); *B32B 2307/102* (2013.01); *B32B 2307/304* (2013.01); *B32B 2315/06* (2013.01); *B32B 2315/08* (2013.01); *B32B 2419/00* (2013.01); *C09J 2433/00* (2013.01); *C09J 2495/00* (2013.01); *E04D 11/02* (2013.01)

(58) Field of Classification Search
USPC ... 156/71, 297, 298, 300, 305, 307.1, 307.3, 156/307.7
See application file for complete search history.

(56) References Cited

U.S. PATENT DOCUMENTS

| | | | | |
|---|---|---|---|---|
| 4,611,978 A | * | 9/1986 | Sangiorgi | ................ B65B 63/08 249/127 |
| 6,110,846 A | * | 8/2000 | Brzozowski | ............ C08L 95/00 442/258 |
| 2003/0192283 A1 | | 10/2003 | Bindschedler et al. | |
| 2006/0059853 A1 | | 3/2006 | Getlichermann et al. | |
| 2010/0192804 A1 | * | 8/2010 | Lapalu | ................. C08K 5/0008 106/277 |
| 2012/0031541 A1 | | 2/2012 | Smith | |
| 2015/0183994 A1 | | 7/2015 | Basset et al. | |

FOREIGN PATENT DOCUMENTS

| | | | | |
|---|---|---|---|---|
| DE | 3419070 A1 | 11/1985 | | |
| EP | 1350900 A1 | 10/2003 | | |
| EP | 1449901 A1 | 8/2004 | | |
| FR | 2691196 A1 | 11/1993 | | |
| FR | 2713686 A1 | 6/1995 | | |
| FR | 2992653 A1 | 1/2014 | | |
| GB | 2222616 A | * | 3/1990 | ............. E04C 2/525 |
| WO | 2008/142249 A1 | 11/2008 | | |

OTHER PUBLICATIONS

Nov. 5, 2015 International Search Report issued in International Patent Application No. PCT/EP2015/058378.
Nov. 5, 2015 Written Opinion issued in International Patent Application No. PCT/EP2015/058378.

* cited by examiner

*Primary Examiner* — Sing P Chan
(74) *Attorney, Agent, or Firm* — Oliff PLC

(57) ABSTRACT

A bituminous composition is used as an adhesive binder. The bituminous composition has at least one acidic additive of general formula (I): R—(COOH)z in which R is a linear or branched, saturated or unsaturated hydrocarbon-based chain having from 4 to 68 carbon atoms, preferably from 4 to 54 carbon atoms, more preferentially from 4 to 36 carbon atoms and z is an integer ranging from 1 to 4, preferably from 2 to 4.

18 Claims, No Drawings

USE OF A BITUMINOUS COMPOSITION AS AN ADHESIVE BINDER

TECHNICAL FIELD

The present invention relates to the use of a bituminous composition as an adhesive binder. The present invention also relates to a process for coating public works, civil engineering works or construction works, in particular floors and/or walls of buildings.

PRIOR ART

Oxidized bitumens are known for their adhesive properties, especially for applications in public works or construction works. They are conventionally used as adhesive binder for sealing membranes or insulating materials on roofs. Oxidized bitumens may be applied or coated cold or hot. Cold application nevertheless proves to be sparingly efficient on certain supports. For hot application or coating, the recommended application temperatures for these oxidized bitumens are generally greater than 200° C. or even greater than 250° C. to obtain sufficient fluidity and to allow their application and the bonding of structures to the floors or walls to be covered. Use at these temperatures entails high energy consumption and requires an additional heating time, increasing the duration of the coating process using the bonding step.

Bituminous compositions have been proposed to replace oxidized bitumens as adhesive binder, in particular non-bituminous compositions, for instance hydraulic binders based on cement and superplasticizer (FR 2 713 686) or bituminous compositions comprising elastomers for hot or cold application. FR 2 691 196 proposes to prepare an insulating covering combining a specific flexible screed with a rigid adhesive of epoxy or polyurethane type optionally mixed with bitumen. EP 1 350 900 describes an adhesive binder formed from a mixture of bitumen/thermoplastic elastomer of SBS, SIS or EVA type for the cold bonding of a heat insulator, i.e. by coating the mixture at a temperature of between 5 and 40° C. A product sold by SOPREMA under the name EAC NEO corresponding to a modified bitumen based on SEBS (polystyrene-b-poly(ethylene-butylene)-b-polystyrene) used for the hot bonding of heat insulators or roofing sealing sheets is also found commercially.

Thus, the first aim of the present invention is to provide an adhesive binder that is efficient, i.e. that makes it possible to bond coatings to structures, for example floors and walls, with improved tensile adhesion strength and debonding strength.

Another object of the invention is to propose an adhesive binder that is easy to use and that can shorten the time required for bonding. In particular, the subject of the present invention is directed toward an adhesive binder for hot application (coating) making it possible to lower the application temperature of bituminous adhesive binders while at the same time being sufficiently workable at this temperature. In particular, the object of the invention is to propose a bituminous adhesive binder which has a working and/or application temperature of less than 190° C., preferably less than 180° C., more preferentially less than or equal to 160° C.

Another object of the invention is to provide a bituminous adhesive binder that is capable of withstanding its transportation and storage conditions.

SUBJECT OF THE INVENTION

The subject of the invention relates to the use of a bituminous composition as an adhesive binder comprising at least one acidic additive of general formula (I):

$$R-(COOH)_z \qquad (I)$$

in which R is a linear or branched, saturated or unsaturated hydrocarbon-based chain comprising from 4 to 68 carbon atoms, preferably from 4 to 54 carbon atoms, more preferentially from 4 to 36 carbon atoms and z is an integer ranging from 1 to 4, preferably from 2 to 4.

According to a preferential embodiment, the acidic additive is a diacid of 20 general formula $HOOC-C_wH_{2w}-COOH$ in which w is an integer ranging from 4 to 22, preferably from 4 to 12 and in which $z=2$ and $R=C_wH_{2w}$.

According to a preferential embodiment, the acidic additive is a diacid chosen from the group formed by adipic acid, pimelic acid, suberic acid, azelaic acid, sebacic acid, undecanedioic acid, 1,2-dodecanedioic acid and tetradecanedioic acid.

According to a preferential embodiment, the bituminous composition comprises from 0.1% to 5% by mass, preferably from 0.5% to 4% by mass, more preferentially from 0.5% to 2.5% by mass of said acidic additive relative to the total mass of said composition.

According to a preferential embodiment, the bituminous composition comprises at least one olefinic polymer adjuvant functionalized with at least glycidyl functional groups.

According to a preferential embodiment, the olefinic polymer adjuvant is chosen from the group consisting of:
(a) statistical or block copolymers, of ethylene and of a monomer chosen from glycidyl acrylate and glycidyl methacrylate, comprising from 50% to 99.7% by mass of ethylene;
(b) statistical or block terpolymers, of ethylene, of a monomer A chosen from vinyl acetate and $C_1$ to $C_6$ alkyl acrylates or methacrylates and of a monomer B chosen from glycidyl acrylate and glycidyl methacrylate, comprising from 0.5% to 40% by mass of units derived from monomer A and from 0.5% to 15% by mass of units derived from monomer B, the remainder being formed from units derived from ethylene; and
(c) copolymers resulting from the grafting of a monomer B chosen from glycidyl acrylate and glycidyl methacrylate to a substrate consisting of a polymer chosen from polyethylenes, polypropylenes, statistical or block copolymers of ethylene and of vinyl acetate and statistical or block copolymers of ethylene and of a $C_1$ to $C_6$ alkyl acrylate or methacrylate, comprising from 40% to 99.7% by mass of ethylene, said grafted copolymers comprising from 0.5% to 15% by mass of grafted units derived from monomer B.

According to a preferential embodiment, the olefinic polymer adjuvant is chosen from statistical or block terpolymers of ethylene, of a monomer A chosen from vinyl acetate and $C_1$ to $C_6$ alkyl acrylates or methacrylates and of a monomer B chosen from glycidyl acrylate and glycidyl methacrylate, comprising from 0.5% to 40% by mass of units derived from monomer A and from 0.5% to 15% by mass of units derived from monomer B, the remainder being formed from units derived from ethylene.

According to a preferential embodiment, the olefinic polymer adjuvant is chosen from statistical terpolymers of ethylene, of a monomer A chosen from $C_1$ to $C_6$ alkyl acrylates or methacrylates and of a monomer B chosen from glycidyl acrylate and glycidyl methacrylate, comprising from 0.5% to 40% by mass of units derived from monomer A and from 0.5% to 15% by mass of units derived from monomer B, the remainder being formed from units derived from ethylene.

According to a preferential embodiment, the bituminous composition comprises from 0.05% to 15% by mass, preferably from 0.1% to 10% by mass, more preferentially from 0.5% to 6% by mass of the olefinic polymer adjuvant relative to the total mass of said composition.

According to a preferential embodiment, the bituminous composition is conditioned in the form of bitumen cakes or in bags made of hot-melt material or in buckets made of hot-melt material.

According to a preferential embodiment, the bituminous composition is used as an adhesive binder for coatings for public works, civil engineering works or construction works, preferably for floor and/or wall coatings, more preferentially for sealing and/or insulating coatings or membranes, flame-retardant panels, heat-insulating and/or sound-insulating panels and expanded glass foam insulating plates.

According to a preferential embodiment, the bituminous composition is used as a hot adhesive binder for coatings for public works, civil engineering works or construction works. The adhesive binder is used and applied at working and application temperatures that are preferably greater than 100° C., preferably greater than 130° C. The working and/or application temperature of the adhesive binder is preferably less than 190° C., more preferentially less than 180° C., even more preferentially less than or equal to 160° C.

The subject of the invention also relates to an adhesive binder for coatings for public works, civil engineering works or construction works, formed by a composition as described previously.

DETAILED DESCRIPTION

According to a particular embodiment, an adhesive binder for coatings for public works, civil engineering works or construction works is prepared by constituting a bituminous composition.

Said bituminous composition is obtained by placing in contact:
a bitumen,
between 0.1% and 5% by mass, preferably between 0.5% and 4% by mass, more preferentially between 0.5% and 2.5% by mass of an acidic additive.

The mass percentages are calculated relative to the total mass of the bituminous composition.

According to this particular embodiment, the bituminous composition thus comprises from 95% to 99.9% of bitumen as described previously. The bituminous composition The process is performed at working temperatures of between 100° C. and 200° C., preferably between 150° C. and 200° C., more preferentially between 160° C. and 200° C., and with stirring for a time of at least 10 minutes, preferably between 1 hour and 10 hours, more preferentially between 2 hours and 6 hours. The term "working temperature" means the heating temperature of the bitumen before mixing and also the mixing temperature. The heating temperature and time vary according to the amount of bitumen used and are defined by standard NF EN 12594.

Among the bitumens that may be used according to the invention, mention may be made first of bitumens of natural origin, those contained in deposits of natural bitumen, of natural asphalt or bituminous sands and bitumens originating from the refining of crude oil. The bitumens according to the invention are advantageously chosen from bitumens derived from the refining of crude oil. The bitumen may be chosen from bitumen bases or a mixture of bitumen bases derived from the refining of crude oil, in particular bitumen bases containing asphaltenes. The bitumen bases may be obtained via conventional processes for manufacturing bitumens in a refinery, in particular by direct distillation and/or vacuum distillation of petroleum. These bitumens may be optionally visbroken and/or deasphalted. The various bitumens obtained via the refining processes may be combined together to obtain the best technical compromise. The bitumen may also be a recycling bitumen. The bitumens may be bitumens of hard grade or of soft grade. The bitumens according to the invention have a penetrability, measured at 25° C. according to standard EN 1426, of between 5 and 300 1/10 mm, preferably between 10 and 100 1/10 mm, more preferably between 30 and 100 1/10 mm.

According to the invention, the acidic additive corresponds to the general formula (I) below:

$$R—(COOH)z \quad (I)$$

in which R is a linear or branched, saturated or unsaturated hydrocarbon-based chain comprising from 4 to 68 carbon atoms, preferably from 4 to 54 carbon atoms, more preferentially from 4 to 36 carbon atoms and z is an integer ranging from 1 to 4, preferably from 2 to 4, more preferentially equal to 2.

The acidic additives corresponding to formula (I) may advantageously be diacids ($z=2$), triacids ($z=3$) or tetracids ($z=4$). The preferred acidic additives are diacids with $z=2$. Similarly, the group R is preferably a saturated linear hydrocarbon-based chain of formula $C_wH_{2w}$ with w being an integer ranging from 4 to 22, preferably from 4 to 12.

The acidic additives in particular have the general formula HOOC—$C_wH_{2w}$—COOH in which w is an integer ranging from 4 to 22, preferably from 4 to 12. These acidic additives correspond to the preceding formula (I) in which $z=2$ and $R=C_wH_{2w}$.

The preferred diacids are the following:
adipic acid or 1,6-hexanedioic acid with $w=4$
pimelic acid or 1,7-heptanedioic acid with $w=5$
suberic acid or 1,8-octanedioic acid with $w=6$
azelaic acid or 1,9-nonanedioic acid with $w=7$
sebacic acid or 1,10-decanedioic acid with $w=8$
undecanedioic acid with $w=9$
1,2-dodecanedioic acid with $w=10$
tetradecanedioic acid with $w=12$.

The diacids may also be diacid dimers of unsaturated fatty acid(s), i.e. dimers formed from at least one unsaturated fatty acid, for example from a single unsaturated fatty acid or from two different unsaturated fatty acids. The diacid dimers of unsaturated fatty acid(s) are conventionally obtained by intermolecular dimerization reaction of at least one unsaturated fatty acid (for example Diels-Alder reaction). Preferably, only one type of unsaturated fatty acid is dimerized. They are in particular derived from the dimerization of an unsaturated fatty acid that is especially $C_8$ to $C_{34}$, especially $C_{12}$ to $C_{22}$, in particular $C_{16}$ to $C_{20}$ and more particularly $C_{18}$. A preferred fatty acid dimer is obtained by dimerization of linoleic acid, which may then be partially or totally hydrogenated. Another preferred fatty acid dimer has the formula HOOC—$(CH_2)_7$—CH=CH—$(CH_2)_7$—COOH. Another preferred fatty acid dimer is obtained by dimerization of methyl linoleate. Similarly, fatty acid triacids and fatty acid tetracids may be found, which are obtained, respectively, by trimerization and tetramerization of at least one fatty acid.

According to a particular embodiment, the bituminous composition comprises from 0.1% to 5% by mass, preferably from 0.5% to 4% by mass, more preferentially from 0.5% to 2.5% by mass of the acidic additive relative to the total mass of said composition.

According to another particular embodiment, a bituminous composition is prepared by placing in contact:

a bitumen, between 0.1% and 5% by mass, preferably between 0.5% and 4% by mass, more preferentially between 0.5% and 2.5% by mass of an acidic additive, and between 0.05% and 15% by mass, preferably between 0.1% and 10% by mass, more preferentially between 0.5% and 6% by mass of an olefinic polymer adjuvant.

According to this particular embodiment, the bituminous composition thus comprises from 80% to 99.85% of bitumen as described previously.

The bitumen and the acidic additive are as described above.

The olefinic polymer adjuvant is preferably chosen from the group consisting of (a) ethylene/glycidyl (meth)acrylate copolymers; (b) ethylene/monomer A/monomer B terpolymers and (c) copolymers resulting from the grafting of a monomer B onto a polymer substrate.

(a) The ethylene/glycidyl (meth)acrylate copolymers are advantageously chosen from statistical or block copolymers, preferably statistical copolymers, of ethylene and of a monomer chosen from glycidyl acrylate and glycidyl methacrylate, comprising from 50% to 99.7% by mass, preferably from 60% to 95% by mass, more preferentially 60% to 90% by mass of ethylene.

(b) The terpolymers are advantageously chosen from statistical or block terpolymers, preferably statistical terpolymers, of ethylene, of a monomer A and of a monomer B.

The monomer A is chosen from vinyl acetate and $C_1$ to $C_6$ alkyl acrylates or methacrylates.

The monomer B is chosen from glycidyl acrylate and glycidyl methacrylate. The ethylene/monomer A/monomer B terpolymers comprise from 0.5% to 40% by mass, preferably from 5% to 35% by mass, more preferentially from 10% to 30% by mass of units derived from monomer A and from 0.5% to 15% by mass, preferably from 2.5% to 15% by mass of units derived from monomer B, the remainder being formed from units derived from ethylene.

(c) The copolymers result from the grafting of a monomer B chosen from glycidyl acrylate and glycidyl methacrylate to a polymer substrate. The polymer substrate consists of a polymer chosen from polyethylenes, especially low-density polyethylenes, polypropylenes, statistical or block copolymers, preferably statistical copolymers, of ethylene and of vinyl acetate and statistical or block copolymers, preferably statistical copolymers, of ethylene and of a $C_1$ to $C_6$ alkyl acrylate or methacrylate, comprising from 40% to 99.7% by mass, preferably from 50% to 99% by mass of ethylene. Said grafted copolymers comprise from 0.5% to 15% by mass, preferably from 2.5% to 15% by mass of grafted units derived from monomer B.

The olefinic polymer adjuvant is preferably chosen from the ethylene/monomer A/monomer B terpolymers (b) described above.

Advantageously, the olefinic polymer adjuvant is chosen from statistical terpolymers of ethylene, of a monomer A chosen from $C_1$ to $C_6$ alkyl acrylates or methacrylates and of a monomer B chosen from glycidyl acrylate and glycidyl methacrylate, comprising from 0.5% to 40% by mass, preferably from 5% to 35% by mass, more preferentially from 10% to 30% by mass of units derived from monomer A and from 0.5% to 15% by mass, preferably from 2.5% to 15% by mass of units derived from monomer B, the remainder being formed from units derived from ethylene.

According to a particular embodiment, the bituminous composition comprises from 0.05% to 15% by mass, preferably from 0.1% to 10% by mass, more preferentially from 0.5% to 6% by mass of the olefinic polymer adjuvant relative to the total mass of said composition.

The amounts of the acidic additive and, optionally, of the olefinic polymer adjuvant are adjusted as a function of the nature of the bitumen used. In particular, the penetrability targeted is preferably between 20 and 45 ⅟10 mm and the ring-and-ball softening point (RBSP) targeted is preferably greater than 90° C., it being understood that the penetrability is measured at 25° C. according to standard EN 1426 and the RBSP according to standard EN 1427.

According to a particular embodiment, the bituminous composition as described above is preferably conditioned in the form of bitumen cakes or in bags made of hot-melt material or in buckets made of hot-melt material. The term "bitumen cakes" means parallelepipedal-shaped blocks, preferably slabs, with a volume of between 10 000 and 30 000 $cm^3$, preferably between 14 000 and 20 000 $cm^3$ and/or with a mass between 10 and 30 kg, preferably 14 and 20 kg. Advantageously, the bituminous composition as described above is preferably conditioned in the form of bitumen cakes or in bags or buckets made of hot-melt material. These bitumen cakes are advantageously wrapped in a thermoplastic film or contained in a box whose wall of the inner face is conventionally silicone-lined. The bituminous composition conditioned in bitumen cakes wrapped in a thermoplastic film or in bags or buckets made of hot-melt material has the advantage of being ready to use, i.e. it may be heated directly in the melter without prior unwrapping. The hot-melt material that melts with the bituminous composition does not affect the properties of said composition.

The bituminous composition as described above may also contain other known additives or other known bitumen elastomers such as SB copolymers (copolymer containing styrene and butadiene blocks), SBS copolymers (copolymer containing styrene-butadiene-styrene blocks), SIS copolymers (styrene-isoprene-styrene), SBS* copolymers (copolymer containing styrene-butadiene-starburst styrene blocks), SBR copolymers (styrene-b-butadiene-rubber), EPDM copolymers (ethylene propylene diene modified). These elastomers may also be crosslinked according to any known process, for example with sulfur. Nevertheless, it will be preferred to use a bituminous composition containing only bitumen and the acidic additive as described above, as an adhesive binder.

The subject of the invention concerns a process for bonding a coating for public works, civil engineering works or construction works, in particular floors and/or walls of buildings, comprising a step of using a bituminous composition as described above, as an adhesive binder. The bonding process according to the invention may apply to any type of conventional coating, preferably sealing coatings for public works, civil engineering works or construction works. The bonding process may advantageously be applied for bonding sealing and/or insulating coatings or membranes, flame-retardant panels, heat-insulating and/or sound-insulating panels and expanded glass foam insulating plates.

According to a particular embodiment, a process for bonding a coating for public works, civil engineering works or construction works comprises the heating of the bituminous composition according to the invention described above to a working temperature according to any known process, followed by applying a coat of said bituminous composition at an application temperature according to any known process.

The bonding process is advantageously a hot bonding process. In particular, the working and application temperatures are advantageously greater than 100° C., preferably greater than 130° C.

Advantageously, the working and application temperatures are less than 190° C., preferably less than 180° C., more preferentially less than or equal to 160° C.

For example, a process for bonding a sealing coating for a concrete roof of a building comprises the following successive steps:

Heating the bituminous composition according to the invention described above to a working temperature of less than 190° C., preferably less than 180° C., more preferentially less than or equal to 160° C., according to any known process. For example, cakes of the bituminous composition as described previously may be heated in a melter up to the working temperature.

Applying a coat of said bituminous composition, with a thickness of between 0.1 and 3 mm, preferably between 0.5 and 1.5 mm, to the concrete of the roof. The bituminous composition is applied at an application temperature of less than 190° C., preferably less than 180° C., more preferentially less than or equal to 160° C., according to any known process.

Application of a sealing membrane to the coat of bituminous composition.

According to another particular embodiment, a process for bonding a sealing and insulating coating for the concrete roof of a building comprises the following successive steps:

Heating the bituminous composition according to the invention described above to a working temperature of less than 190° C., preferably less than 180° C., more preferentially less than or equal to 160° C., according to any known process. For example, cakes of the bituminous composition as described previously may be heated in a melter up to the working temperature.

Application of a first coat of said bituminous composition, with a thickness of between 0.1 and 3 mm, preferably between 0.5 and 1.5 mm, to the concrete of the roof. The bituminous composition is applied at an application temperature of less than 190° C., preferably less than 180° C., more preferentially less than or equal to 160° C., according to any known process.

Insertion of expanded glass foam insulating plates onto the first coat so as to cover the concrete of the building with a uniform insulating coat.

Application of a second coat of bituminous composition according to the invention described above, with a thickness of between 0.1 and 3 mm, preferably between 0.5 and 1.5 mm, onto the coat of insulating plates. The bituminous composition is applied at an application temperature of less than 190° C., preferably less than 180° C., more preferentially less than or equal to 160° C., according to any known process.

Application of a sealing membrane onto the second coat.

The first and second coats of the bituminous composition are applied according to any known process, for example using a sprinkler, a flat knife or a brush.

The working and application temperatures are advantageously greater than 100° C., preferably greater than 130° C.

The bituminous composition according to the invention is particularly efficient as an adhesive binder and may be used at lower temperatures than those of the prior art. This characteristic is particularly noteworthy since it makes it possible to minimize the energy consumption and the duration of the bonding process. In addition, the bituminous composition according to the invention has improved mechanical properties allowing conditioning suitable for its transportation and storage.

EXAMPLES

The invention is illustrated by the examples that follow, which are given for non-limiting purposes. The rheological and mechanical characteristics of the bitumens or of the bituminous compositions to which reference is made in these examples are measured in the manner indicated in Table 1.

TABLE 1

| Property | Abbreviation | Unit | Measurement standard |
|---|---|---|---|
| Needle penetrability at 25° C. | $P_{25}$ | $\frac{1}{10}$ mm | NF EN 1426 |
| Ring-and-ball softening point | RBSP | ° C. | NF EN 1427 |
| Brookfield viscosity* | — | MPa · s | NF EN 13302 |

Oxidized Bitumens

Three different oxidized bitumens noted $B_{ox1}$, $B_{ox2}$ and $B_{ox3}$ are used:

Oxidized bitumen $B_{ox1}$ of 110/30 grade, corresponding to a bitumen with an RBSP of 113° C. and a P25 of 25 $\frac{1}{10}$ mm.

Oxidized bitumen $B_{ox2}$ of 85/25 grade, corresponding to a bitumen with an RBSP of 85° C. and a P25 of 28 $\frac{1}{10}$ mm.

Oxidized bitumen $B_{ox3}$ of 100/40 grade, corresponding to a bitumen with an RBSP of 100° C. and a P25 of 40 $\frac{1}{10}$ mm.

Bituminous Compositions

Three bituminous compositions are used:

Composition $C_1$ containing a bitumen base of 70/100 grade whose characteristics correspond to standard NF EN 12591 and 1.4% by mass of sebacic acid. Composition $C_1$ is prepared by heating the bitumen base at 160° C. for 1 hour to 1 hour 30 min and then introducing sebacic acid in the form of granules and maintaining at a temperature of 160° C. for about 30 min.

Composition $C_2$ containing a bitumen base of 70/100 grade, 4% by mass of a polymer adjuvant and 1% by mass of sebacic acid.

The polymer adjuvant is an ethylene/butyl acrylate/glycidyl methacrylate terpolymer in mass proportions, respectively, of 70/21/9 and having a melt flow rate (MFR) (190° C./2.16 kg) of 8 g/10 min, calculated according to standard ASTM D1238-ISO1133.

Composition $C_2$ is prepared by heating the 70/100 bitumen base to 160° C. and then adding the polymer adjuvant and heating at 160° C. for about 2 hours, followed by adding the sebacic acid in the form of granules and maintaining at a temperature of 160° C. for about 30 min.

Composition $C_3$ is a bituminous composition comprising a polystyrene-b-poly(ethylene-butylene)-b-polystyrene (SEBS) polymer specially designed for the hot bonding of heat insulators or of sealing membranes and sold by the company SOPREMA under the name EAC NEO.

Properties of the Bitumen/Polymer Compositions

The characteristics of the oxidized bitumens $B_{ox1}$, $B_{ox2}$ and $B_{ox3}$ and bituminous compositions $C_1$, $C_2$ and $C_3$ measured according to the standards mentioned above are given in Table 2 below:

TABLE 2

| Adhesive binder | $B_{ox1}$ | $B_{ox2}$ | $B_{ox3}$ | $C_1$ | $C_2$ | $C_3$ |
|---|---|---|---|---|---|---|
| P25 (1/10 mm) | 25 | 28 | 40 | 29 | 38 | 42 |
| RBSP (° C.) | 113 | 85 | 100 | 115 | 77 | 76.5 |
| Brookfield viscosity at 150° C. (mPa · s) | 7480 | 1058 | 2246 | 170 | 621 | 776 |

Compositions $C_1$ and $C_2$ according to the present invention have viscosities at 150° C. lower than those of the oxidized bitumens $B_{ox1}$, $B_{ox2}$ and $B_{ox3}$ and of composition $C_3$ from Soprema. Thus, compared with the adhesive binders of the prior art, the compositions according to the invention are sufficiently workable at low temperature to be applied at temperatures of the order of 160° C., thus reducing the energy consumption and the duration of application of the adhesive binder and thus of the coating process.

It is also observed that composition $C_1$ has an RBSP and a penetrability P25 equivalent to those of the oxidized base $B_{ox1}$.

It is also observed that composition $C_2$ has an RBSP and a penetrability P25 equivalent to those of the oxidized base $B_{ox2}$.

The values for the RBSP and penetrability P25 pair make it possible to evaluate the consistency of the bitumens and of the bituminous compositions and also their resistance to deformation. Thus, the higher the RBSP and the lower the penetrability, the more the bituminous composition has good consistency and high resistance to deformation.

The bituminous compositions according to the present invention have a consistency equivalent to the oxidized bitumens of the prior art, while at the same time allowing application at a lower temperature than that of the oxidized bitumens.

Creep Tests

The creep test is performed as follows. A mass of 0.5 kg of each sample of adhesive binder is hot-cast into a scrap metal mould and then stripped from the mould when cold. The cakes thus obtained are placed in furnaces at various temperatures and under a load of 2.5 kg (±50 g) to simulate the stacking of the cakes on each other, during their transportation. Specifically, 6 cakes are generally stacked vertically on a pallet during the transportation of bitumen cakes. The blocks are first placed in the furnace at a temperature of 40° C. If no creep is observed after a certain time, at most after 15 days, further cakes are moulded and placed at a higher furnace temperature. This operation is repeated until substantial creep of the cakes is observed. The creep is reflected by deformation of the cakes and flowing of the bituminous composition. The cakes thus deformed are then unusable as adhesive binder. Evaluation of the creep is performed visually in a qualitative manner.

Table 3 below collates the results of the creep test obtained for the various samples.

TABLE 3

| Adhesive binder | | $B_{ox1}$ | $B_{ox2}$ | $B_{ox3}$ | $C_1$ | $C_2$ | $C_3$ |
|---|---|---|---|---|---|---|---|
| Furnace temperature (° C.) | 40 | slight creep after 3 days | slight creep after 3 days | slight creep after 3 days | no creep* | no creep* | slight creep in 4 h |
| | 50 | creep in 24 h | substantial creep in 24 h | creep in 24 h | no creep* | no creep* | creep in 24 h |
| | 60 | np** | np** | np** | no creep* | no creep* | np** |
| | 70 | np** | np** | np** | no creep | no creep | np** |
| | 80 | np** | np** | np** | no creep | no creep | np** |
| | 85 | np** | np** | np** | slight creep after 6 days | slight creep after 6 days | np** |

*No creep observed after 15 days at temperature.
**np: not pertinent; the adhesive binder was not tested since creep is observed for lower temperatures.

Only the bituminous compositions $C_1$ and $C_2$ according to the present invention, conditioned in the form of cakes, do not creep under the conventional storage and transportation conditions.

Peel Test

The principle of the test consists in exerting a traction on a sample formed by two identical strips of sealing membrane bonded together with the adhesive binder to be tested. Each strip has an initial length of 15 cm. The two strips are assembled by casting at 160° C. a coat 1 to 2 mm thick of the adhesive binder onto one face of one of the membrane strips. Next, the two strips are applied together and maintained thus joined until the adhesive binder is cooled to form the test sample. Only one end of the two strips of the sample is not bonded over a length of about 4 cm. After returning the sample to room temperature, the peel test is performed using a tensile testing machine sold by the company Zwick and equipped with a heating chamber for performing the test at 23° C. Each non-bonded part of the end of the sample is held by a jaw of the tensile testing machine. The initial distance between the two jaws is 50 mm. The traction angle between the two membranes of the sample, initially at 90° gradually opens as the traction proceeds, which is performed at a rate of 100 mm/min. Under the stress, the membranes of the sample stretch until the adhesive binder yields and the membranes become detached or until at least one of the membranes breaks.

The tensile testing machine measures the mean stress applied to the sample ($\tau_{mean}$), the maximum separation distance between the two jaws before detachment of the two membranes as a percentage relative to the initial distance between the two jaws ($D_{max}$), and the energy supplied to reach this maximum separation distance ($E_{max}$). The results are collated in Table 4 below.

TABLE 4

| Adhesive binder | $B_{ox2}$* | $B_{ox3}$* | $C_1$ | $C_2$ | $C_3$* |
|---|---|---|---|---|---|
| $\tau_{max}$ (MPa) | 0.9 | 0.35 | 1.3 | 1.2 | 0.6 |
| $D_{max}$ (%) | 150 | 120 | 300 | 350 | 350 |
| $E_{max}$ (J) | 2.5 | 1.1 | 8.7 | 6.9 | 3.5 |

*The implementation required a temperature of 190° C. instead of 160° C.

The bituminous compositions $C_1$ and $C_2$ according to the present invention are particularly efficient as adhesive binder when compared with the oxidized bitumens. This is evidenced by the results of the peel test, in which it is noted that the maximum stress $\tau_{max}$, the distance $D_{max}$ and the energy $E_{max}$ are markedly higher than those for the adhesive binders $B_{ox2}$ and $B_{ox3}$.

When compared with the bituminous composition $C_3$ comprising a polystyrene-b-poly(ethylene-butylene)-b-polystyrene (SEBS) polymer, the bituminous compositions $C_1$ and $C_2$ give maximum stress $\tau_{max}$ and energy $E_{max}$ values that are markedly higher, for an equivalent $D_{max}$ value.

The bituminous compositions according to the present invention are particularly noteworthy in that they are more efficient as adhesive binder than the adhesive binders of the prior art, especially when compared with oxidized bitumens and bitumens modified with elastomers. They are also easy to use. They have very good fluidity at a temperature of 150° C., which makes it possible to use them as adhesive binder at an application temperature of less than 190° C., preferably less than 180° C., more preferentially less than or equal to 160° C. On the other hand, to obtain a fluidity sufficient to allow their use as adhesive binder, the recommended application temperature of oxidized bitumens is generally from about 220° C. to 250° C. At this temperature, the energy consumed is high and the heating time is long. The recommended application temperature of the adhesive binder $C_3$ is from 190° C. to 200° C. At this temperature, the energy consumption and heating time problems still remain problematic.

The invention claimed is:

1. Process for bonding a coating to a structure, wherein said process comprises:
    providing a bituminous composition comprising at least one acidic additive of general formula (I): R—(COOH)z in which R is a linear or branched, saturated or unsaturated hydrocarbon-based chain comprising from 4 to 68 carbon atoms, and z is an integer ranging from 1 to 4,
    applying at least one layer of the bituminous composition to the structure, and
    subsequently applying the coating thereon.

2. Process according to claim 1, wherein the acidic additive is a diacid of general formula HOOC—$C_wH_{2w}$—COOH in which w is an integer ranging from 4 to 22.

3. Process according to claim 2, wherein the acidic additive is a diacid chosen from the group formed by adipic acid, pimelic acid, suberic acid, azelaic acid, sebacic acid, undecanedioic acid, 1,2-dodecanedioic acid and tetradecanedioic acid.

4. Process according to claim 1, wherein said composition comprises from 0.1% to 5% by mass of said acidic additive relative to the total mass of said composition.

5. Process according to claim 1, wherein said composition comprises at least one olefinic polymer adjuvant functionalized with at least glycidyl functional groups.

6. Process according to claim 5, wherein the olefinic polymer adjuvant is chosen from the group consisting of:
    (a) statistical or block copolymers, of ethylene and of a monomer chosen from glycidyl acrylate and glycidyl methacrylate, comprising from 50% to 99.7% by mass of ethylene;
    (b) statistical or block terpolymers, of ethylene, of a monomer A chosen from vinyl acetate and $C_1$ to $C_6$ alkyl acrylates or methacrylates and of a monomer B chosen from glycidyl acrylate and glycidyl methacrylate, comprising from 0.5% to 40% by mass of units derived from monomer A and from 0.5% to 15% by mass of units derived from monomer B, the remainder being formed from units derived from ethylene; and
    (c) copolymers resulting from the grafting of a monomer B chosen from glycidyl acrylate and glycidyl methacrylate to a substrate consisting of a polymer chosen from polyethylenes, polypropylenes, statistical or block copolymers of ethylene and of vinyl acetate and statistical or block copolymers of ethylene and of a $C_1$ to $C_6$ alkyl acrylate or methacrylate, comprising from 40% to 99.7% by mass of ethylene, said grafted copolymers comprising from 0.5% to 15% by mass of grafted units derived from monomer B.

7. Process according to claim 6, wherein the olefinic polymer adjuvant is chosen from statistical or block terpolymers of ethylene, of a monomer A chosen from vinyl acetate and $C_1$ to $C_6$ alkyl acrylates or methacrylates and of a monomer B chosen from glycidyl acrylate and glycidyl methacrylate, comprising from 0.5% to 40% by mass of units derived from monomer A and from 0.5% to 15% by mass of units derived from monomer B, the remainder being formed from units derived from ethylene.

8. Process according to claim 6, wherein the olefinic polymer adjuvant is chosen from statistical terpolymers of ethylene, of a monomer A chosen from $C_1$ to $C_6$ alkyl acrylates or methacrylates and of a monomer B chosen from glycidyl acrylate and glycidyl methacrylate, comprising from 0.5% to 40% by mass of units derived from monomer A and from 0.5% to 15% by mass of units derived from monomer B, the remainder being formed from units derived from ethylene.

9. Process according to claim 5, wherein said composition comprises from 0.05% to 15% by mass of the olefinic polymer adjuvant relative to the total mass of said composition.

10. Process according to claim 1, wherein said composition is conditioned in the form of bitumen cakes or in bags made of hot-melt material or in buckets made of hot-melt material.

11. Process according to claim 1, for bonding coatings for public works, civil engineering works or construction works.

12. Process according to claim 1, wherein the structure comprises floors and/or walls of buildings.

13. Process according to claim 12, wherein the process comprises the following successive steps:
    heating the bituminous composition to a working temperature of less than 190° C.,
    applying the at least one layer of said bituminous composition, with a thickness of between 0.1 and 3 mm, to the floors and/or walls, at an application temperature greater than 100° C. and less than 190° C., and
    applying a sealing membrane to the at least one layer of bituminous composition.

14. Process according to claim 12, wherein the process comprises the following successive steps:
    heating the bituminous composition to a working temperature of less than 190° C., applying a first layer of said bituminous composition, with a thickness of between 0.1 and 3 mm, at an application temperature greater than 100° C. and less than 190° C., inserting expanded glass foam insulating plates onto the first layer so as to cover the floors and/or walls of the building with a uniform insulating coat, applying a second layer of the bituminous composition with a thickness of between 0.1 and 3 mm, onto the coat of insulating plates, at an application temperature greater than 100° C. and less than 190° C., and applying a sealing membrane onto the second layer.

15. Process according to claim 12, wherein the coating is chosen from sealing or insulating coatings or membranes, flame-retardant panels, heat-insulating or sound-insulating panels and expanded glass foam insulating plates.

16. Process according to claim 1, wherein the process further comprises, after providing the bituminous composition but before applying the at least one layer of the bituminous composition, heating the bituminous composition to a working and application temperature.

17. Process according to claim 16, wherein the working and application temperature is greater than 100° C.

18. Process according to claim 16, wherein the working and application temperature is less than 190° C.

* * * * *